United States Patent [19]

Fujioka

[11] Patent Number: 5,151,582
[45] Date of Patent: Sep. 29, 1992

[54] AUTOMATIC TRANSACTION MACHINE SYSTEM FOR CHECKING CARD DATA AND EMBOSSED CHARACTERS

[75] Inventor: Toshinori Fujioka, Shibata, Japan
[73] Assignee: Hitachi, Ltd., Tokyo, Japan
[21] Appl. No.: 450,456
[22] Filed: Dec. 14, 1989

[30] Foreign Application Priority Data

Dec. 21, 1988 [JP] Japan ................. 63-320378

[51] Int. Cl.⁵ .................. G06K 7/12; G06K 5/00; G06K 7/00; G06K 7/14
[52] U.S. Cl. ..................... 235/469; 235/437; 235/440; 235/449; 235/454
[58] Field of Search ........... 235/454, 440, 469, 462, 235/437, 449; 382/1, 11

[56] References Cited

U.S. PATENT DOCUMENTS

| | | | |
|---|---|---|---|
| 3,937,928 | 2/1976 | Sasaki et al. | 235/454 |
| 4,013,894 | 3/1977 | Foote et al. | 235/440 |
| 4,023,040 | 5/1977 | Weber | 235/469 |
| 4,041,279 | 8/1977 | Foote | 235/454 |
| 4,211,918 | 7/1980 | Nyfeler et al. | 235/487 |
| 4,389,634 | 6/1983 | Nakamura | 382/11 |
| 4,641,239 | 2/1987 | Takesako | 235/379 |
| 4,816,657 | 3/1989 | Stockburger et al. | 235/493 |

FOREIGN PATENT DOCUMENTS 6029868 2/1985 Japan .

Primary Examiner—Stuart S. Levy
Assistant Examiner—Christopher R. Glembocki
Attorney, Agent, or Firm—Fay, Sharpe, Beall, Fagan, Minnich & McKee

[57] ABSTRACT

In order to check if information stored on a card is authentic, the embossed character and figure information is compared with the information on the card. The rays radiated from the light emitting elements arranged in a line pass through a slit whose width is substantially equal to the thickness of embossed portions. Then, the rays are reflected on a card surface and received at an optical sensor consisting of LED elements arranged in a line as the card is in transit. The optical sensor is oriented in a manner to keep the same angle of reflection as the angle of incidence with respect to a normal. The light emitting elements are oriented to form another angle of incidence. These elements are used for reading the printed characters. To read a color pattern, a sensor having a photo detection sensitivity toward a normal of the card serves to receive the scattered rays reflected on the card, which rays are obliquely radiated to the card.

9 Claims, 3 Drawing Sheets

AUTOMATIC TRANSACTION MACHINE SYSTEM FOR CHECKING CARD DATA AND EMBOSSED CHARACTERS

BACKGROUND OF THE INVENTION

The present invention relates to an automatic transaction machine system, and more particularly to an automatic transaction machine system which is proper for crime prevention. For that purpose, the system employs a card providing a magnetic stripe or an integrated circuit and embossed characters, figures, and symbols.

JP-A-60-29868 discloses an individual Identification System for comparing information contained on a card with a user's voice or fingerprint in order to check if the user is the owner of the card.

The currently available cards have two functions of imprinting embossed characters, figures, and symbols on impact paper and electromagnetically reading or writing information from or onto a magnetic stripe or an I.C. A card having an integrated circuit embedded therein is often called an IC card. The card is used under the process which comprises the steps of inquiring of a central file saved in a banking facility of a key-input PIN (Personal Identification Number); checking if the PIN is equal to an account number read from the magnetic stripe or I.C. on the card; if they are equal to each other, confirming that the card user is the card owner; and starting the transaction. This process involves a risk that if an adversary unjustly obtains another person's account number and PIN by any means, he can do an unjust transaction by tampering with the magnetic stripe data of the card or the electric data of the I.C. Further, the foregoing prior art requires an expensive facility as well as users to do intricate operations, because a user must register his own voice or fingerprint in advance. This system thus is unfeasible in a large-scaled system such as a global on-line banking system.

SUMMARY OF THE INVENTION

It is an object of the invention to provide an automatic transaction machine system which is capable of easily authenticating a card user.

It is a further object of the invention to provide an automatic transaction machine system which requires an inexpensive facility and is more effective in crime prevention.

It is a still further object of the invention to provide an automatic transaction machine system which is capable of preventing unjust use of a tampered card in the automatic transaction machine.

It is another object of the invention to provide an automatic transaction machine system which is capable of checking if the magnetic (electric) data of a transfer card matches the printed content, improving operativity and reliance, and preventing reverse insertion of the transfer card.

For achieving the foregoing objects, the automatic transaction machine system requires means for reading information such as a banking facility name and an account number written on a magnetic stripe or an I.C. of a card and means for reading information embossed on a card surface so as to check if both match each other. Moreover, if necessary, at a time, it may detect physical and optical features such as a banking facility name, a color, and a design printed on a card surface for generally checking these features.

The automatic transaction machine system operates according to the following steps. At first, a magnetic head or a contact pin head reads out information written in a magnetic stripe or an I.C. of a card. Then, a light source radiates rays to the magnetic card surface at an oblique angle, resulting in making a levelled portion of the card surface bright and the tops and one-sides of embossed portions of the card surface dark. An image sensor, which is positioned to receive regularly-reflected rays from the card surface, catches image information where the bright embossed portions appear in the background of the bright card surface. After the caught image information is subjected to recognition processing, the embossed banking facility name, account number, personal name, and so forth are character-coded. On the other hand, the magnetic head or the contact pin reads out information such as a banking facility name, an account number, and a personal name from a magnetic stripe or an I.C. Then, it is checked if both optical and magnetic data (electric) read from the card match each other. If they are equal, the card is authenticated.

For more positively preventing unjust transaction by using a tampered card, it is possible to perform further checks for a printed card name or a color design like a banking facility logo using an image sensor and a color sensor.

DESCRIPTION OF PREFERRED EMBODIMENT

Figure 1:
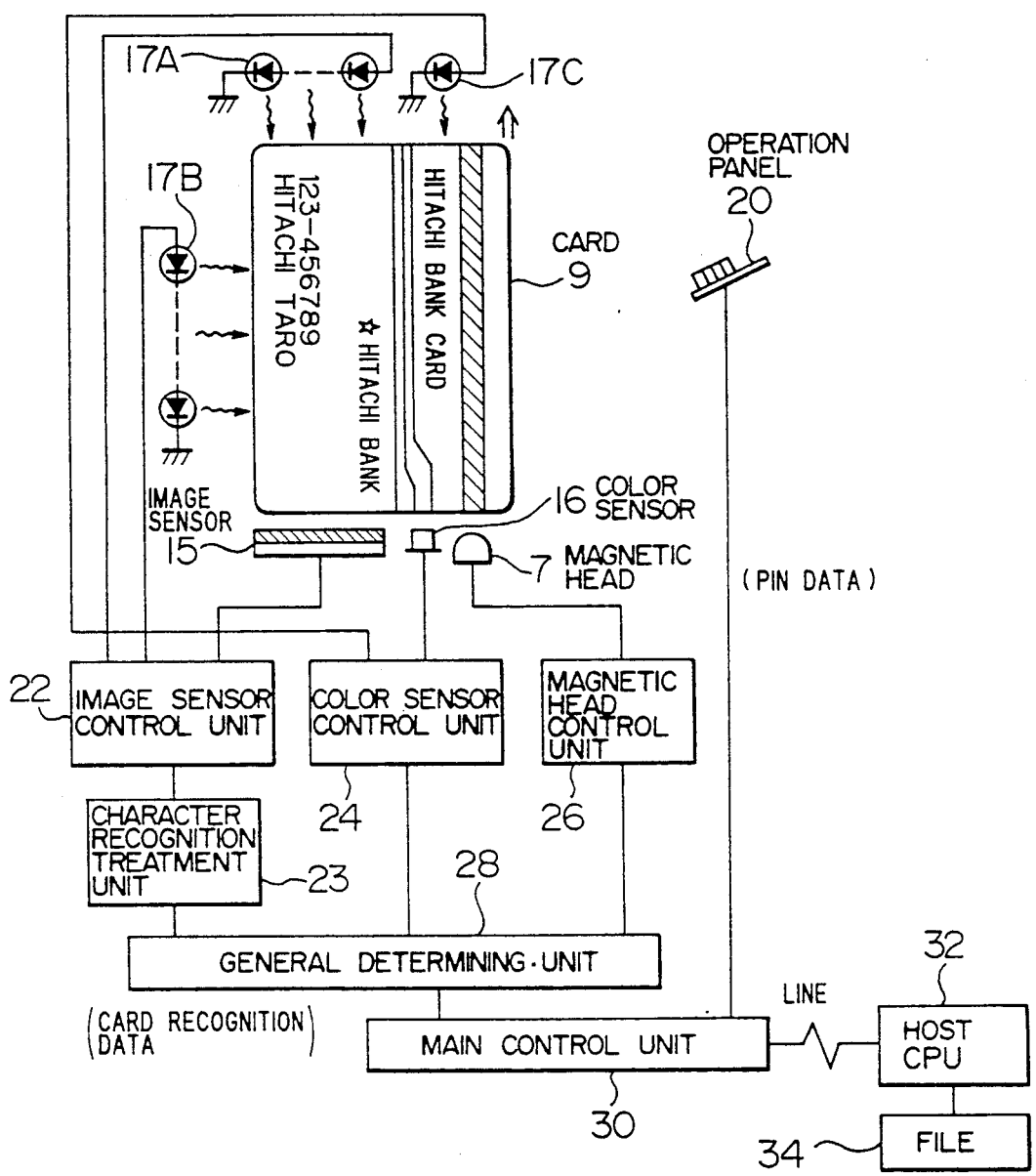
FIG. 1 is a block diagram showing a signal-processing system for authenticating a card in an automatic transaction machine system according to the invention.
Figure 2:
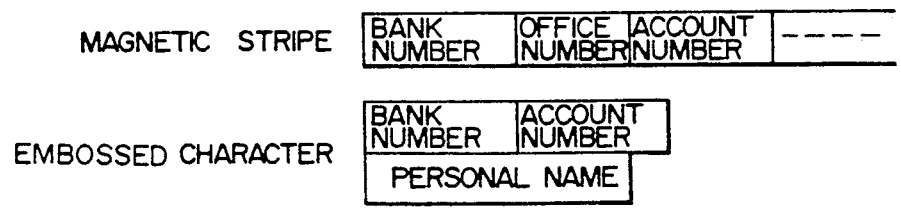
FIG. 2 is an illustration showing data formats of a magnetic card.
Figure 3:
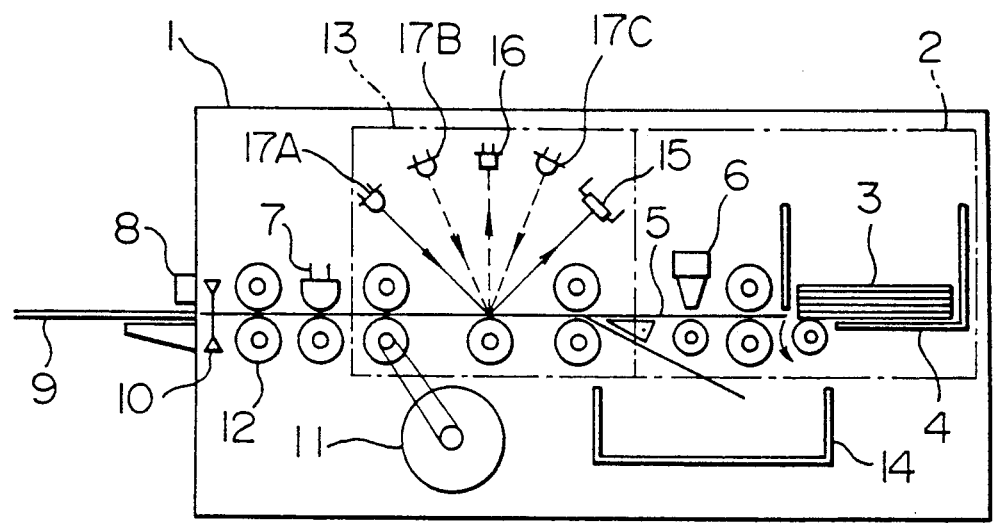
FIG. 3 is a view showing the schematic disposition of a card-processing mechanism according to an embodiment of the invention.

An embodiment of the invention will be described with reference to the drawings. FIG. 1 is a block diagram showing a signal-processing system for authenticating a card in an automatic transaction machine. The automatic transaction machine incorporates an operation panel 20 by which a customer enters transaction content, a cash-drawing mechanism (not shown) for depositing or drawing cash, a main control unit 30, and a power source (not shown). FIG. 2 illustrates data formats of a magnetic stripe and embossed portions contained in a customer's magnetic card. FIG. 3 shows the schematic disposition of a card-processing mechanism 1, in which a transfer-card-issuing unit 2 serves to issue a paper card referred to as a transfer card 3 storing necessary data for transfer transaction. A customer enters on the keyboard a banking facility name, an account name, and a company or personal name to which cash is to be transferred and requires a transfer card 3 to be issued. Then, the transfer card 3 is conveyed from a hopper 4 to a path 5. Next, a printing head 6 prints on the transfer card banking facility names, account numbers, accounts, and data about the transferor and transferee. The printed information is then written on a magnetic stripe on the back surface of the transfer card, the card being issued at an insertion inlet 8 from which the customer takes it. The transfer card is used at each transfer by a customer and is useful for eliminating a number of key operation steps.

Next is a description as to how to process an embossed magnetic card made of plastic. As shown in FIG. 3, the processing is such that a magnetic card 9 is inserted into the insertion inlet 8, a card sensor 10 checks if the card is treatable based on a card size and a magnetic stripe signal. If it is determined to be a regulated card, it is conveyed directly under the magnetic head 7 by a roller 12 driven by the motor 11, such that necessary data is read from the magnetic stripe, as the card is in travel. According to this embodiment, the means for reading information from the magnetic stripe may employ a control system including the magnetic head 7 as shown in FIG. 1.

Upon completion of reading the magnetic stripe, the magnetic card 9 is conveyed to an optical reader unit 13 at which optical features such as a design or color printed on the embossed portions and the surface of the magnetic card 9 are read out. According to this embodiment, the means for optically reading information saved on the convex portions of the card surface may employ an optical reader unit 13 and the control system shown in FIG. 1. A recovery box 14 is used for saving the magnetic card 9 and the transfer card 3 a predetermined time later if a customer leaves them at the insertion inlet without taking them.

Figure 4:
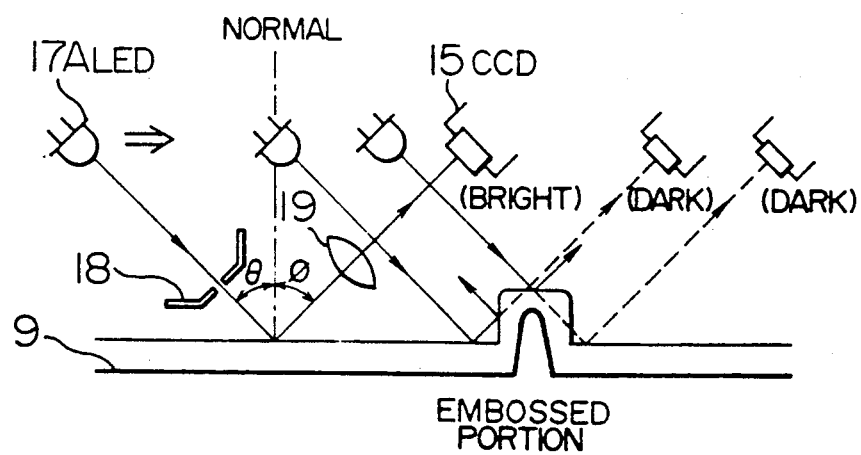
FIG. 4 is a concept view showing a reading mechanism for a convex image of embossed portions according to the invention.

The optical reader unit 13 may include an image sensor 15 for reading information from the embossed portions and printed design on the magnetic card 9 and characters printed on the transfer card 3 and a color sensor 16 for reading information from the printed color design. The image sensor 15 is composed of photo detector elements like CCDs arranged in a line. To read a convex image of the embossed portions, an LED array 17A is lit and, to read a levelled image of the printed design on the magnetic card 9 and the printed characters on the transfer card 3, an LED array 17B is lit. The color sensor 16 is mounted above a specified site of the magnetic card 9 where a distinctive color such as a banking facility logo is printed. When the color sensor 16 is to read the color, the LED arrays 17C are lit. FIG. 4 is a concept view showing a reading mechanism for a convex image of the embossed portions. In FIG. 4, the optical system of the image sensor 15 is adjusted to position at a site that enables regularly-reflected rays from the surface of the magnetic card 9 to be received, that is, in a manner that an angle of incidence $\theta$ and an angle of reflection $\phi$ are equal with respect to a normal and the largest amount of rays can be received, preferably between 45° and 75°. The rays radiated from the LED array 17A is partitioned through a slit 18 in a line before reaching the magnetic card 9. On the other hand, a lens 19 of the image sensor 15 is adjusted so as to receive the linear rays from the levelled surface of the magnetic card 9.

Figure 5:
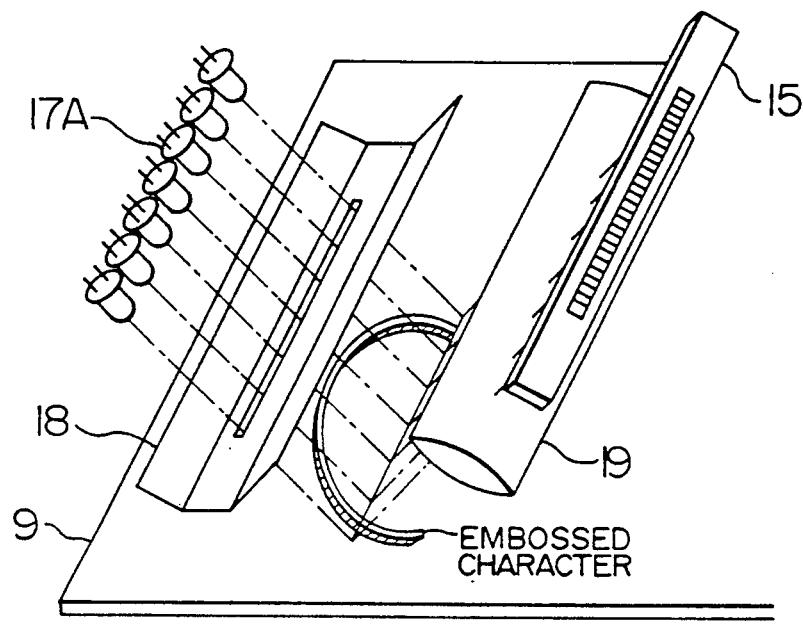
FIG. 5 is a view showing the disposition of a light source according to one embodiment of the invention.

FIG. 5 is a perspective view showing the foregoing optical system. In the shown system, the LED array 17A denotes a light source containing a lot of LEDs arranged in a line. The slit 18 serves to limit the width of incident rays to a predetermined width and pass straight and parallel components of the rays. It is better to arrange the predetermined width between 0.2 to 0.5 mm to be about the thickness of the embossed portions, because as it is narrower, an S/N ratio becomes better in reading information, though, the allowance for warp or transformation of the magnetic card becomes lower. A cylindrical lens 19 is disposed between the magnetic card 9 and the image sensor 15 in a manner to be in parallel with the image sensor 15. It serves to focus rays on the image sensor 15, though, keep rays between the LED array 17A and the image sensor 15 parallel.

Figure 6:
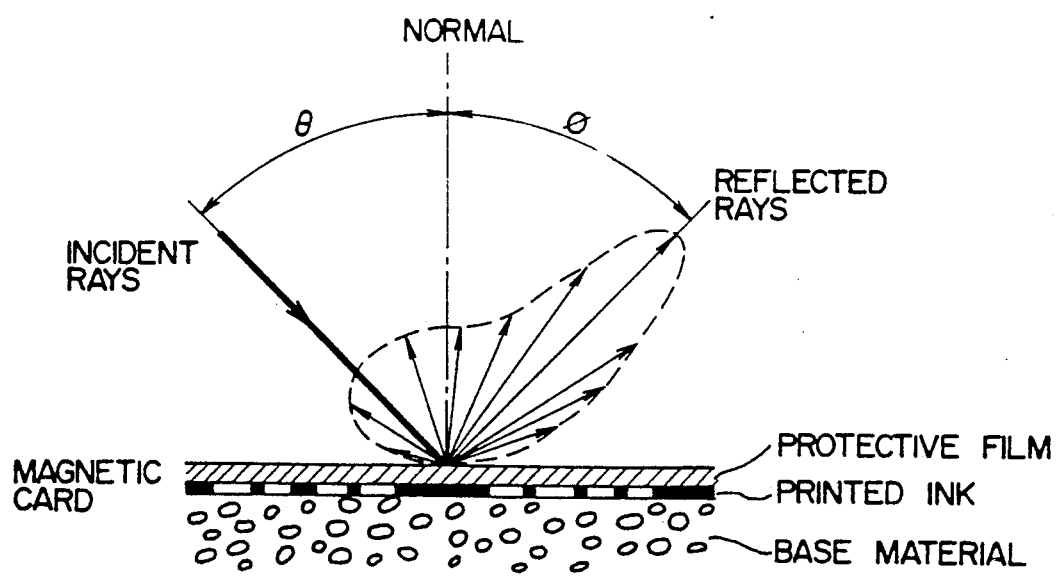
FIG. 6 is a view showing light-reflected characteristics on a magnetic card in the system according to an embodiment of the invention.

FIG. 6 shows light-reflective characteristics of the magnetic card 9. Since the magnetic card 9 provides a glossy and smooth protective film, however, the position for receiving regularly-reflected rays (the relation between 17A and 15 is $\theta = \phi$) is not necessarily proper, because the almost of the received rays is reflected from the protective film surface.

An LED array 17B, that is, a luminous section used in reading a design printed under the protective film has a relation of $\theta = \phi$ with the image sensor 15 so that the sensor can receive the diffused components of the reflected rays.

Under this relation, the position of the magnetic card 9 is relatively changed with respect to the optical reader unit 13. This results in the amount of rays received in the image sensor 15 being more from the levelled portion of the magnetic card 9 and less from the tops and sides of the embossed portions. That is, only the embossed portions appear dark. The bright and dark image makes it possible to read the embossed characters and figures.

In FIG. 1, the magnetic head 7, which serves to read or write data to or from the magnetic stripe of the magnetic card 9; is controlled by a magnetic head control unit. The color sensor 16 and the LED array 17C are controlled by a color sensor control unit 24, and the image sensor 15 and the LED array 17A, 17B are controlled by an image sensor control unit 22. The operation panel 20 is controlled by a main control unit 30. The image sensor 15 senses the printed characters of the embossed portions of the magnetic card 9 and the transfer card 3. Then, these sensed characters are transmitted from an image sensor control unit 22 to a character recognition unit 23 in which they are character-coded. Next, the card information is entered into a general checking unit 28. The data formats recorded on the magnetic stripe and on the embossed portions of the magnetic card 9 are regulated by each banking facility.

FIG. 2 shows one example of data formats. The general checking unit 28 checks if the banking facility numbers and the account numbers recorded on the magnetic stripe are equal to those on the embossed portions of the magnetic card 9 or the magnetic stripe data of the transfer card 3 is equal to that of the printed characters thereof. Further, it checks if the color and design of the magnetic card are equal to those of the banking facility logo registered in this unit. Then, if these checks for the magnetic card 9 or the transfer card 3 are in the affirmative, the data is input as card recognition data to the main control unit 3. On the other hand, the PIN data input by a customer from the operation panel 20 is input into the main control unit. The data is communicated with a host CPU 32 through a line so as to match the data to the information such as an account number recorded in a file 34 saved in the host CPU 32. Finally, the transaction is started. Also, the automatic transaction system is able to employ an I.C. card providing an integrated circuit embedded therein in addition to the card embossed characters, figures and symbols.

I claim:

1. An automatic transaction machine system giving access to information recorded on a card as embossed figures and printed information before starting a transaction comprising:
    (a₁) data read means for reading data stored by said card;
    (a) means for controlling said data read means to read data stored by said card,
    (b) first light emitting means for radiating a first set of rays onto figures embossed on a surface of said card,
    (c) second light emitting means for radiating a second set of rays onto printed information on said card;
    (d) image sensor means for receiving one of said first and second sets of rays after reflection from said card, said image sensor means including a plurality of photodetector elements,
    (e) means for controlling said image sensor means, and
    (f) checking means, connected to said data read controlling means and said image sensor means, for comparing information from said data read by said data read means with both of said embossed figures and said printed information for determining legitimacy of said card.

2. A system according to claim 1, wherein the first set of rays emitted by said first light emitting means and received by said image sensor means define respective propagation paths that further define respective angles of incidence and reflection to a normal of a surface of said card, wherein the respective angles of incidence and reflection are substantially equal to each other in absolute value.

3. A system according to claim 2, wherein said first light emitting means is disposed to enable said image sensor to receive the first set of rays regularly-reflected from the embossed information, and said second light emitting means is disposed to enable said image sensor to receive a diffused component of the second set of rays reflected from the printed information;
    wherein said second light emitting means is disposed so as to define an angle between said card normal and the second set of rays that is smaller than an angle $\phi$ between the rays diffusely reflected by said card surface and said card normal.

4. A system according to claim 3 further comprising a color sensor substantially oriented along the card normal for receiving light reflected from a specific color design coated on the card, and
    a third light emitting means, disposed relatively opposite to said second light emitting means with respect to said color sensor, for radiating light toward said printed characters,
    wherein when the specific color design on the card is read, said first light emitting means is deenergized and said third light emitting means is energized.

5. A system according to claim 1, further comprising:
    means forming a slit for providing an aperture through which at least some of the first set of rays pass from said first light emitting means towards said card;
    wherein each said embossed figure is characterized by a substantially common height above the card surface, and wherein said slit is disposed substantially perpendicular to the first set of rays radiated from said first light emitting means, said slit having a substantially equal width to the height of said embossed figures above the card surface.

6. A system according to claim 5 further comprising an elongated convex lens disposed for focusing rays reflected from said card onto the plurality of photo detector elements included in said image sensor means.

7. A system according to claim 1 further comprising operation input means for receiving a request for issuance of a paper card, and
    control means for instructing said first light emitting means to radiate the first set of rays onto the figures embossed on said card in accordance with said request for issuance of a paper card, for instructing said image sensor means to read the information embodied in said embossed figures, and for issuing a paper card containing printed information corresponding to the information embodied in said embossed figures.

8. An automatic transaction machine system including a checking means for reading information recorded on a card before starting a transaction, said checking means having means for reading information stored in a magnetic stripe on said card, means for optically reading embossed information formed on a surface of said card, means for optically reading printed information formed on said card, and means for determining whether the information stored in the magnetic stripe is identical to the printed information and the embossed information.

9. A method for preventing unauthorized use of an automatic transaction machine card having information stored in a magnetically-readable region located thereon, having embossed information stored in a first optically-readable region located thereon, and having printed information stored in a second optically-readable region located thereon, comprising the steps of:
    reading a set of information from the magnetically-readable region;
    reading a set of embossed information from the first optically-readable region;
    reading a set of printed information from the second optically-readable region;
    comparing the magnetically-readable information with both the embossed and printed information; and
    verifying the authenticity of the card if both comparisons indicate identity of compared information, and indicating that the card is not authentic if at least one of the comparisons indicates a lack of identity of compared information.

* * * * *